US008173018B2

(12) United States Patent
Burr et al.

(10) Patent No.: US 8,173,018 B2
(45) Date of Patent: May 8, 2012

(54) FLUID FILTER MODULE INCLUDING SEALED BOSS

(75) Inventors: Scott T. Burr, Midland, MI (US); Matthew J. Hallan, Minneapolis, MN (US); Matthew D. Mittag, Midland, MI (US); Matthew J. Turpin, Linden, MI (US); Gavin D. Vogel, Warren, MI (US)

(73) Assignee: Dow Global Technologies LLC, Midland, MI (US)

( * ) Notice: Subject to any disclaimer, the term of this patent is extended or adjusted under 35 U.S.C. 154(b) by 143 days.

(21) Appl. No.: 12/862,881

(22) Filed: Aug. 25, 2010

(65) Prior Publication Data

US 2012/0048795 A1 Mar. 1, 2012

(51) Int. Cl.
*B01D 63/02* (2006.01)
*B01D 63/06* (2006.01)
*B01D 35/30* (2006.01)

(52) U.S. Cl. .................. 210/321.79; 210/232; 210/240; 210/321.8; 210/321.88; 210/321.89; 210/348; 210/437; 210/500.23

(58) Field of Classification Search ................. 210/232, 210/240, 321.79, 321.8, 321.88, 321.89, 210/348, 435, 500.23, 437
See application file for complete search history.

(56) References Cited

U.S. PATENT DOCUMENTS

| | | | |
|---|---|---|---|
| 4,689,191 | A | 8/1987 | Beck et al. |
| 5,055,198 | A | 10/1991 | Shettigar |
| 5,151,180 | A | 9/1992 | Giordano et al. |
| 5,320,238 | A | 6/1994 | Verdesca et al. |
| 5,327,862 | A | 7/1994 | Bedi |
| 2003/0038075 | A1 | 2/2003 | Akimoto et al. |
| 2005/0082216 | A1 | 4/2005 | Tump |
| 2009/0032455 | A1 | 2/2009 | Tada et al. |

FOREIGN PATENT DOCUMENTS

| | | |
|---|---|---|
| DE | 202009011061 | 4/2010 |
| EP | 1335162 | 8/2003 |
| JP | 61192309 | 8/1986 |
| WO | 9735125 | 9/1997 |
| WO | 2008110166 | 9/2008 |

OTHER PUBLICATIONS

Ultrafiltration, Meaningful protection for your water treatment processes, Dow UF Module Brochure, (2008).
Ultrafiltration Modules, Dow UF Module Brochure.

*Primary Examiner* — John Kim
(74) *Attorney, Agent, or Firm* — Edward W. Black

(57) ABSTRACT

A fluid filter module including an end cap assembly disposed about at least one end of a tubular-shaped housing. The end cap assembly includes a base, fluid port and sealed boss which may optionally comprise an integrally molded structure.

5 Claims, 3 Drawing Sheets

FLUID FILTER MODULE INCLUDING SEALED BOSS

FIELD OF THE INVENTION

The invention is directed toward fluid filter modules and associated component parts.

DESCRIPTION OF THE RELATED ART

Fluid filter modules are used in a wide variety of applications ranging from industrial processing of liquids and gases to residential purification of drinking water. Filter modules typically include a tubular-shaped housing defining an inner chamber with one or more fluid ports located near each end of the housing. In operation, fluid enters the module via a port and passes through a separation medium (e.g. semi-permeable membrane) located within the inner chamber. Fluid passing through the membrane exits the module by way of a separate fluid port, typically located at the opposite end of the module. Various modes of operation are known including dead-end flow and cross-flow modes. Filter modules may also include additional fluid ports or channels including inlets for introducing liquid or gas for cleaning the module. Examples of such modules include DOW™ Ultrafiltration module models: SFP-2860, SFP-2880, SFD-2860 and SFD-2880 available from The Dow Chemical Corporation. These filter modules include semi-permeable hollow fiber membranes design for ultrafiltration-type applications such as the treatment of water. The above-mentioned modules include fluid ports that are molded as an integral part of an end cap assembly mounted on each end of the module housing. As fluid ports are located at fixed locations about the module, installation configurations can be limited. This can be particularly problematic when installing modules within confined locations, as part of assemblies including a plurality of modules aligned in close proximity, or where placement of fluid inlet and outlet lines are limited.

BRIEF SUMMARY OF THE INVENTION

The present invention is directed toward fluid filter modules and associated component parts along with methods for making and using the same. The present filter modules include a tubular housing extending along an axis between two opposing ends which defines an inner chamber. The module further includes at least one an end cap assembly comprising a base disposed concentrically about an end of the housing, a fluid port extending radially outward from the base, and at least one sealed boss extending radially outward from the base. Additional embodiments are also described including those wherein the base, fluid port and sealed boss comprise an integral molded structure.

BRIEF DESCRIPTION OF THE DRAWINGS

The invention and various embodiments may be better understood by reference to the detailed description and accompanying figures. The figures are provided to facilitate description and are not necessarily to scale. Within these sections, like reference numerals refer to like elements.

DETAILED DESCRIPTION OF THE INVENTION

Figure 1:
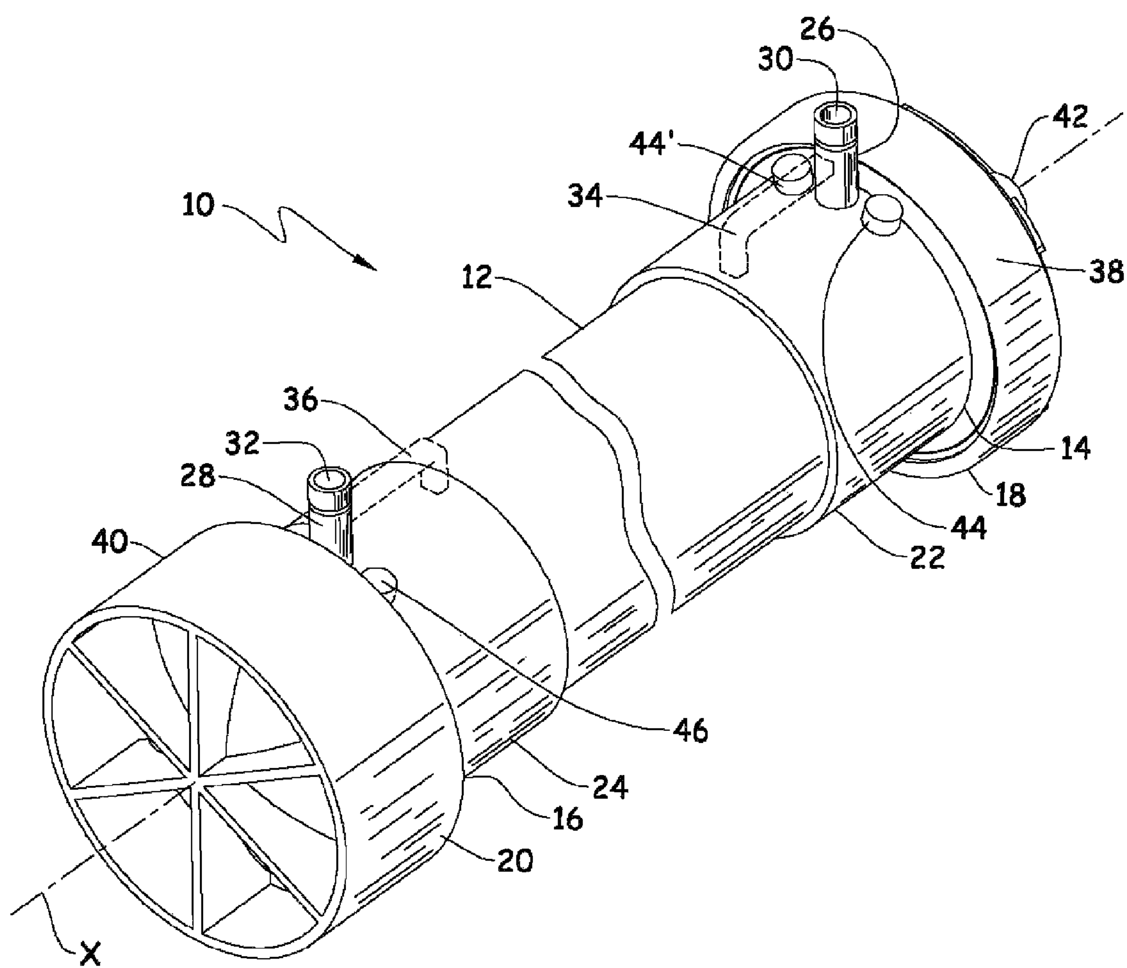
FIG. 1 is a partially cut-away perspective view of a fluid filter module according to one embodiment of the invention.

For purposes of the present description, the term "filter" is intended to describe a module capable of separating constituents based upon a wide variety of separation mechanisms including but not limited to: pore flow, solution-diffusion, ion exchange, adsorption and chelation. The present filter module is applicable for "filtering" a wide range of fluids including both gases and liquids. Examples of common liquid-based separations include organic and aqueous-based feeds.

The present filter module may include a wide variety of separation mediums including membrane-based modules (e.g. spiral wound, hollow fiber, capillary and tubular membrane modules or "elements") and media-based modules (e.g. a cartridge of granular-type material such as ion exchange resin, adsorbent media, e.g. carbon, titanium oxide and the like). Representative semi-permeable membranes include those made from: polysulfones, polyether sulfones, polyvinylidene fluoride, polyamides, polyacrylonitrile, etc. The subject module may be used in a wide range of applications including but not limited to microfiltration (MF), ultrafiltration (UF), nanofiltration (NF) and reverse osmosis (RO) and pervaporation. In preferred embodiments, the module includes at least one semi-permeable membrane located within an inner chamber of the housing. In a preferred sub-set of embodiments, a plurality of semi-permeable hollow fiber membranes are orientated axially within the inner chamber. The ends of the hollow fibers may be sealed from the inner chamber by way of known "potting" techniques wherein one or both ends of the hollow fibers remain open and in fluid communication one or more outer chambers formed within the end cap assembly.

The present filter module preferably comprises a tubular-shaped housing, (e.g. an elongated shell having a length greater than its width), extending along an axis between two opposing ends and defining an inner chamber. In one preferred embodiment, the outer periphery of the filter module is cylindrically-shaped having a circular cross-section. In an alternative embodiment, the housing may have a polygonal cross-section. The housing may be constructed from a wide variety of materials, e.g. plastics, ceramics, metals, etc., however, in one set of preferred embodiments the housing is made from an injection moldable plastic such as polyvinyl chloride (PVC) or acrylonitrile butadiene styrene (ABS).

The filter module further comprises an end cap assembly including a base which is concentrically disposed about an end of the housing. An end cap assembly is preferably located at each end of the module. In preferred embodiments the inner periphery of the base of the assembly includes a matching or complementary configuration with that of the outer periphery of the end of the housing such that the base can be slid, tightly fitted and preferably sealed about the end of the housing. Depending upon the materials of construction, the base may be secured to the housing via mechanical means, e.g. pressure fit, clamps, matching threads, etc., or may be adhered such as by way of ultrasonic welding, spin welding, adhesive, etc., or combinations of such techniques. The end cap assembly further includes a fluid port extending radially outward from the base (i.e. in a direction perpendicular to the axis defined by the length of the housing). The fluid port comprises a raised nozzle-like structure including a passageway which is in fluid communication with the inner chamber of the housing. The end cap assembly may be constructed from a wide variety of materials, e.g. plastics, ceramics, metals, etc., however, in a preferred set of embodiments the housing is made from an injection moldable plastic such as polyvinyl chloride (PVC) or acrylonitrile butadiene styrene (ABS). The end cap assembly may include additional fluid inlets and outlets of various orientations. In a preferred embodiment, the end cap assembly also includes a fluid port (i.e. "channel") extending axially outward from the base.

The filter module may include an optional handle comprising an elongated gripping member extending from the fluid port to the base of the end cap assembly. The elongated member, fluid port and base collectively form an opening (i.e. closed loop) which may be adapted for gripping or otherwise handling the module. In a preferred embodiment, the handle, base and fluid port comprise an integral molded structure, e.g. a single injection molded part.

With reference to FIG. 1, a representative fluid filter module is generally shown at 10, including a tubular-shaped housing (12) extending along an axis (X) between opposing ends (14, 16) and defining an inner chamber (not shown). An end cap assembly (18, 20) is located at each end (14, 16) of the housing (12). Each end cap assembly (18, 20) comprises an annular base (22, 24) disposed concentrically about each end (14, 16) of the housing (12). The end caps assemblies (18, 20) each comprise a fluid port (26, 28) extending radially outward from the base in a direction perpendicular to the axis (X). The fluid ports (26, 28) are cylindrical and each define a passageway (30, 32) which is in fluid communication with the inner chamber of the housing (12). An optional handle comprising an L-shaped elongated gripping member (34, 36) (shown in phantom) extends from the fluid port (26, 28) to the base (22, 24) and defines an opening adapted for handling the module. The end cap assemblies (18, 20) further include end caps (38, 40) which are secured to the base (22, 24) e.g. via matching threads, and which define outer chambers (shown in FIG. 2). While end caps (38, 40) may be identical, in the embodiment illustrated in FIG. 1 a "top" end cap (38) includes an outer concave periphery including a centrally located fluid channel (42) extending axially from the base (22), whereas a "bottom" end cap (40) includes a flat planar surface adapted for supporting the module in a vertical orientation.

At least one end cap assembly (18, 20) further includes one or more sealed bosses (44, 44', 46) extending radially outward from the base (22, 24). Each boss comprises a raised wall or annulus defining a passageway to the inner chamber of the module (10) along with a top plate in sealing engagement with the raised wall. As will be described in connection with FIG. 3, the top plate prevents fluid communication with the inner chamber until such time as the top plate is removed, e.g. by drilling, to form a fluid port. The sealed bosses (44, 44', 46) provide structural support to the base (22, 24) during and after the removal of the top plate. The sealed bosses (44, 44', 46) are preferable molded as an integral structure along with the base (22, 24) of the end cap assembly (18, 20). Once the top plate or portion thereof is removed, the resulting fluid port may be connected, e.g. via mating threads, to a fluid source, e.g. pressurized gas, negative pressure, etc. In order to provide flexibility during installation, one or more sealed bosses (44, 44') may be positioned about a base (22) of an end cap assembly (18). The inclusion of multiple bosses allows the module (10) to be interconnected with fluid lines in a variety of different configurations, i.e. the boss located closest to a desired fluid source may be tapped while the other bosses remained sealed. In one preferred embodiment, a plurality of bosses (44, 44') are aligned concentrically about the base (22) along a plane bisecting the axis (X) of the module (10).

Figure 2:
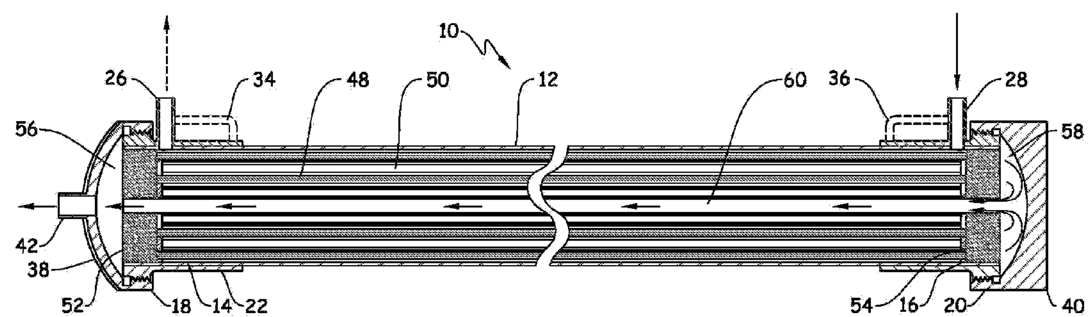
FIG. 2 is a partially cut-away, cross-sectional elevational view of the embodiment of FIG. 1.

FIG. 2 is a partially cut-away perspective view of the embodiment of FIG. 1. A plurality of semi-permeable hollow fibers (48) are orientated along the axis (X) within an inner chamber (50) of the housing (12). The opposing ends of the hollow fibers (48) are sealed from the inner chamber (50) by a mass of potting material (52, 54), (e.g. polyurethane, epoxy, silicone) but open and in fluid communications with outer chambers (56, 58) located within each end cap assembly (18, 20). The outer chambers (56, 58) are in fluid communication with each other by way of a center tube (60) extending centrally along the axis (X) of the module (10). In operation, pressurized feed fluid (e.g. untreated water) enters the inner chamber (50) by way of fluid port (28) and flows along the length of the hollow fibers (48). A portion of the feed fluid passes through semi-permeable membrane (e.g. hollow fibers (48) and travels to the outer chambers (56, 58) of the end cap assemblies (18, 20) where it ultimately exits the module (12) by one or more fluid channels (42), as generally shown by solid arrows. In the illustrated embodiment, permeate (i.e. filtered fluid) of both outer chambers (56, 58) exits the module from a common fluid channel (42). Alternatively, each outer chamber (56, 58) may include a separate fluid channel (not shown). When operating in dead-end mode, the second fluid port (26) is sealed; whereas when operating in cross-flow mode (arrow shown in phantom) the second fluid port (26) is open and provides an outlet for concentrated feed fluid to exit the module. In the illustrated embodiment, both ends of the hollow fibers (48) are in fluid communication with outer chambers (56, 58). In an alternative embodiment, the hollow fibers (48) may be sealed at one end (e.g. end (16)). While described as operating "outside-in" mode (i.e. feed liquid contacting the outside of the hollow fiber membranes), the module may alternatively be operated in "inside-out" mode wherein feed fluid is introduced inside the lumen portion of the hollow fibers. While feed fluid is typically introduced into the module under pressure, the module may alternatively be operated by applying negative pressure to the permeate side of the semi-permeable membrane, or a combination of both negative and positive pressures.

Figure 3:
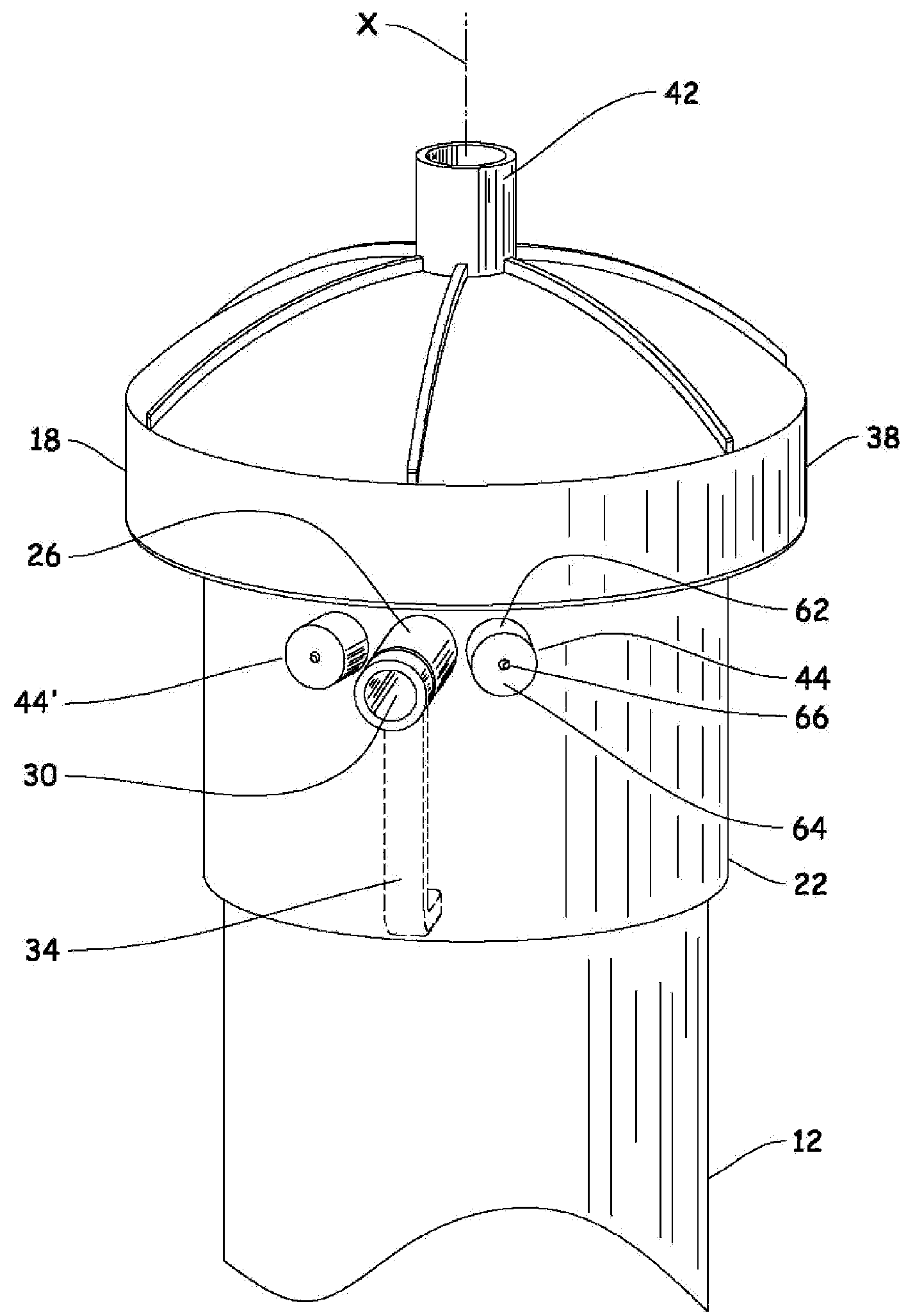
FIG. 3 is an enlarged, partially cut-away perspective view of the embodiment of FIG. 1.

FIG. 3 shows an enlarged perspective view of the end cap assembly (18) including a base (22), end cap (38) and fluid channel (42). As with the embodiment illustrated in FIG. 1, the base (22) includes a fluid port (26), optional handle (34) and sealed bosses (44, 44'). Each sealed boss (44, 44') includes a raised wall or "annulus" (62) extending radially outward from the base (22) which defines a passageway (not shown) to the inner chamber of the module. While shown as having a circular configuration, the sealed boss may have an alternative configuration, e.g. polygonal, elliptical, etc. Each sealed boss (44, 44') further includes a top plate (64) in sealing engagement with the raised wall (62). The top plate (64) prevents fluid passage through the passageway defined by the raised wall (62) until such time as the top plate (64) or portion thereof is removed, such as by way of drilling away a portion of the top plate. The top plate (64) preferably defines a flat surface. The flat surface of the top plate (64) provides a planar contact surface which facilitates drilling or other operations designed to unseal the boss (44, 44'). In a preferred embodiment, the top plate (64) includes a centrally located indent (66) which facilitates proper alignment of drilling operations. Once a portion of the top plate has been removed, e.g. via drilling through the top plate, the resulting passageway may be threaded or otherwise adapted for receiving a fluid line. The raised wall (62) of the boss (44, 44') provides added strength to the base (22) during drilling, tapping or similar operations directed toward unsealing the boss (44, 44'). The top plate (64) and raised wall (62) are preferably integrally molded with the fluid port (26) and base (22) and form a single integrated part. In the illustrated embodiment, the sealed bosses (44, 44') are aligned concentrically about the base (22) along a plane bisecting the axis (X) of the module. The sealed bosses (44, 44') are preferable located in close proximity to the fluid port (26); e.g. with a common arc section comprising less than half the total circumference of the base (18). In operation, the top plates of one or more sealed bosses may be tapped and connected with a source of pressurized fluid or vacuum. In one preferred embodiment, a tapped boss in connected with a source of pressurized air which can be selectively initiated during washing or back-washing operations.

Many embodiments of the invention have been described and in some instances certain embodiments, selections, ranges, constituents, or other features have been characterized as being "preferred". The designation of a feature as being "preferred" should not be interpreted as deeming such features as an essential or critical aspect of the invention. While shown as including an end cap assembly at both ends of the housing, the subject module includes embodiments which include only one end cap assembly.

What is claimed is:

1. A fluid filter module comprising:

a tubular-shaped housing extending along an axis between two opposing ends and defining an inner chamber, an end cap assembly located at each end of said housing where at least one end cap assemblies comprises:

a base disposed concentrically about an end of said housing, a fluid port extending radially outward from said base, wherein said fluid port defines a passageway in fluid communication with said inner chamber, and at least one sealed boss extending radially outward from said base and defining a passageway to said inner chamber, wherein said seal boss comprises a top plate which prevents fluid communication with said inner chamber, an indent located at the center of said top plate and wherein said base, fluid port and sealed boss comprise an integral molded structure, and a filter located within the inner chamber of the housing.

2. The fluid filter module of claim 1 wherein said end cap assembly comprises a plurality of sealed bosses.

3. The fluid filter module of claim 1 wherein said end cap assembly comprises a plurality of sealed bosses aligned concentrically about said base along a plane bisecting the axis of said module.

4. The fluid filter module of claim 1 wherein said module further comprises at least one semi-permeable membrane located within said inner chamber.

5. The fluid filter module of claim 4 wherein said semi-permeable membrane comprises a plurality of hollow fibers.

* * * * *